United States Patent
Takata et al.

(10) Patent No.: US 9,303,708 B2
(45) Date of Patent: Apr. 5, 2016

(54) CHIPPING-RESISTANT VIBRATION DAMPER IN FORM OF SHEET

(71) Applicants: NIHON TOKUSHU TORYO CO., LTD, Tokyo (JP); TOYOTA JIDOSHA KABUSHIKI KAISHA, Aichi (JP)

(72) Inventors: Ayumi Takata, Aichi (JP); Kunitoshi Nakamoto, Aichi (JP)

(73) Assignees: NIHON TOKUSHU TORYO CO., LTD., Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 135 days.

(21) Appl. No.: 14/357,943

(22) PCT Filed: Feb. 18, 2013

(86) PCT No.: PCT/JP2013/053881
§ 371 (c)(1),
(2) Date: May 13, 2014

(87) PCT Pub. No.: WO2013/129164
PCT Pub. Date: Sep. 6, 2013

(65) Prior Publication Data
US 2014/0312542 A1    Oct. 23, 2014

(30) Foreign Application Priority Data
Feb. 27, 2012  (JP) .................................. 2012-040443

(51) Int. Cl.
*F16F 1/36*      (2006.01)
*C09J 7/02*      (2006.01)
(52) U.S. Cl.
CPC ............. *F16F 1/3605* (2013.01); *C09J 7/0203* (2013.01)
(58) Field of Classification Search
CPC ............. F16F 1/36; F16F 1/3605; C09J 7/02; C09J 7/0203; E04B 1/98
See application file for complete search history.

(56) References Cited

U.S. PATENT DOCUMENTS

| 5,066,708 | A | * | 11/1991 | Koller, Sr. ............. C08F 265/04 248/633 |
| 5,858,521 | A | | 1/1999 | Okuda |
| 6,596,818 | B1 | * | 7/2003 | Zamore ................. A61L 31/048 128/844 |
| 2010/0048749 | A1 | | 2/2010 | Takata |

FOREIGN PATENT DOCUMENTS

| JP | 05-024150 | 2/1993 |
| JP | 06-247344 | 9/1994 |
| JP | 06-247354 | 9/1994 |
| JP | 06-247355 | 9/1994 |
| JP | 07-068696 | 3/1995 |
| JP | 07-166093 | 6/1995 |
| JP | 08-034089 | 2/1996 |
| JP | 08-182961 | 7/1996 |
| JP | 11-29737 | 2/1999 |
| JP | 2004-115565 | 4/2004 |
| JP | 2008-030257 | 2/2008 |
| JP | 2011-196424 | 10/2011 |

OTHER PUBLICATIONS

Search report from International Bureau of WIPO, mail date is Aug. 20, 2013.

* cited by examiner

*Primary Examiner* — Vishal Sahni
(74) *Attorney, Agent, or Firm* — Greenblum & Bernstein, P.L.C.

(57) ABSTRACT

It provides that a vibration-damping material in form of sheet which can be adhered to even at locations such as underfloor or engine room of a vehicle where both vibration-damping performance and chipping-resistant performance are required by self-adhesive bonding or heat melt adhesive bonding through an adhesive layer composed of a adhesive or a hotmelt adhesive. A vibration-damping material in form of sheet with chipping-resistant performance having both of vibration-damping performance and chipping-resistant performance includes a thermosetting vibration-damping sheet and an adhesive layer, the thermosetting vibration-damping sheet includes one or more than synthetic rubber selected from the group consisting of a styrene-butadiene rubber, a butadiene rubber and a high-styrene rubber; a polybutadienic elastomer; a curing agent; a petroleum resin and an inorganic filler.

4 Claims, No Drawings

CHIPPING-RESISTANT VIBRATION DAMPER IN FORM OF SHEET

CROSS-REFERENCE TO RELATED APPLICATIONS

The present invention is a 35 USC 371 national stage entry of PCT/JP2013/053881, filed Feb. 18, 2013, which claims priority from Japanese Patent Application No. 2012-040443, filed Feb. 27; 2012, the contents of all of which are herein incorporated by reference in their entirety.

FIELD OF THE INVENTION

This invention relates to a vibration-damping material in form of sheet with chipping-resistant performance, especially, a vibration-damping material in form of sheet having both of vibration-damping performance and chipping-resistant performance which can be adhered to underfloor or engine room of a vehicle where vibration-damping performance and chipping-resistant performance are required.

DESCRIPTION OF THE PRIOR ART

In an automobile, its thickness is getting thin by weight reduction and progress of steel plate strength. Therefore, because of requests to prevent dent of the automobile's body and reduce at shutting a door, a material which can give reinforcement of steel plate and vibration-damping performance is attached to the steel plate.

As general vibration-damping materials for the automobile, there are a sheet-form vibration-damping materials containing asphalt as a main material (hereinafter, asphalt sheet) and a spraying type vibration-damping material made of a viscosity-increased coating containing acrylic emulsion as a main material.

These vibration-damping materials generate vibration-damping performance by fusing on surface owing to heating by heat source of coating oven, after being installed or coated on the automobile's floor.

Also, as vibration-damping materials which are used for vertical surface such as wheelhouse, door backside and quarter panel, there are an asphalt sheet on which acrylic adhesive is coated and a pressure sensitive adhesive type vibration-damping material.

This pressure sensitive adhesive type vibration-damping material is the combination of a constraining layer (to be applied for the purpose of giving stiffness to adhesive layer that is one component of the damping material) using asphalt sheet, aluminum foil (or aluminum panel) or glass cloth etc. with butyl-rubber based or butadiene-rubber based self-fuseable layer. These vibration-damping materials can be carried out vibration-damping performance without heating.

These vibration-damping materials all are using at indoor of the automobile such as aforementioned, recently, needs of the vibration-damping materials which can be used too at outdoor of the automobile was increased for the noise prevention measures of the outdoor of the automobile.

However, in order to adapt for outside of the automobile too, there are many problems, for example, as the material which can be used for underfloor or engine room of automobiles, it is necessary that the material having chipping-resistant performance which do not occur a crack and peeling by a stone splatter etc.

In JP-A1-H06-247344, it disclosed that a method of the vibration-damping performance arrangement of the automobile which the vibration-damping material can be utilized to underfloor of the automobile for reason of having chipping-resistant performance, in said method of the vibration-damping performance arrangement, it disclosed that the vibration-damping material included a thermoplastic material as the main constituent can be used, and the vibration-damping material composed of a viscoelastic layer and the constraining layer can be used. Also, thereof concrete content of the vibration-damping material is as follows.

Namely, the vibration-damping material was obtained by the method that a thermosetting resin constraining layer in form of sheet was made by blending and rolling of a syndiotactic 1,2-polybutadiene, a calcium carbonate, a barium sulfate, a sulfur, a vulcanization accelerator, a bronn asphalt and a peroxide at 80 degree C., on the other hand, the viscoelastic layer was made by blending and rolling of a straight asphalt with the mixture composed of a styrene-butadiene rubber, a tackifiers and an oil, and then said vibration-damping material was made by blending and rolling of said thermosetting resin constraining layer with said viscoelastic layer.

In JP-A1-H06-247353, the concrete content of the vibration-damping material is same as aforementioned vibration-damping material of JP-A1-H06-247344, it discloses that the vibration-damping material was obtained by the method that the thermosetting resin constraining layer in form of sheet was made by blending and rolling of the syndiotactic 1,2-polybutadiene, the calcium carbonate, the barium sulfate, the sulfur, the vulcanization accelerator, the bronn asphalt and the peroxide at 80 degree C., on the other hand, the viscoelastic layer was made by blending and rolling of the straight asphalt with the mixture composed of the styrene-butadiene rubber, the tackifiers and the oil, and then said vibration-damping material was made by blending and rolling of said thermosetting resin constraining layer in form of sheet with said viscoelastic layer.

However, in JP-A1-H06-247353, at the occasion of utilization for under-floor of the automobile, the method having character that the automobile oneself was inverted discloses. In JP-A1-H06-247355, the concrete content of the vibration-damping material is same as aforementioned the vibration-damping material of JP-A1-H06-247344, it discloses that the vibration-damping material was obtained by the method that the thermosetting resin constraining layer in form of sheet was made by blending and rolling of the syndiotactic 1,2-polybutadiene, the calcium carbonate, the barium sulfate, the sulfur, the vulcanization accelerator, the bronn asphalt and the peroxide at 80 degree C., on the other hand, the viscoelastic layer was made by blending and rolling of a straight asphalt with the mixture composed of the styrene-butadiene rubber, the tackifiers and the oil, and then said vibration-damping material was made by blending and rolling of said thermosetting resin constraining layer with said viscoelastic layer.

However, in JP-A1-H06-247355, at the occasion of utilization for under-floor of the automobile, the method having character that the vibration-damping material loaded on a under-mold putting in the lower side of the automobile and the automobile declined discloses.

In JP-A1-2004-115565, it was disclosed that the asphalt material having chipping-resistant which the coating thereof does not occur cracking and peeling in association with the stone splatter (chipping) even at under cold circumstance of minus 20 degree C., the asphalt material is excellent in cold and impact resistance performance, also, the coating thereof has high vibration-damping performance. Said asphalt material having chipping-resistant is the material having chipping-resistant included the asphalt as main component, and included an isocyanate resin, a epoxy resin and a curing agent of these resins, aforementioned asphalt is a straight asphalt.

In JP-A1-H11-29737, it was disclosed that a latex which can be made the coating compound effectively having chipping-resistant performance and vibration-damping performance in reasonable coating thickness, and high quality coating film can be formed, said latex is stable for lengthy periods of time.

Also, said latex is a copolymer latex obtained by copolymerization of (a) an aliphatic conjugated dienic monomer from 5 to 60% by weight, (b) an ethylenic unsaturated carboxylic acid monomer from 0.1 to 10% by weight and (c) a monomers excepted these monomers from 30 to 94.9% by weight in the presence of α-methyl styrene dimmer.

Said copolymer latex is the copolymer latex for aqueous coating which copolymer thereof have loss factor (tan δ) of one more than peak at temperature range of from 0 to 60 degree C. and toluene insoluble residual of copolymer thereof is from 10 to 90% by weight.

In JP-A1-H08-247355, the constitution method of the coating of the automobile having vibration-damping performance disclosed.

Said method have the following characterization.

Namely, in order to give vibration-damping performance for the coating composition's coating film having chipping-resistant performance coated on mainly the wheelhouse and the underfloor of the automobile, firstly, vinyl-chloride-plastisol coating composition 1 included cross-linking auxiliary agent 5 to 40 weight part, an organic peroxide from 0.02 to 0.5 weight part and a foaming agent from 2 to 20 weight part for vinyl chloride type resin 100 weight part was coated, after that time, on this coating film, vinyl chloride plastisol coating composition 2 included adhesive gave agent from 1 to 30 weight part for vinyl chloride type resin 100 weight part was coated, after heating and drying at temperature from 120 to 180 degree C. and from 20 to 40 minutes.

In JP-A1-H07-166093, an aqueous emulsion type coating composition having chipping-resistant performance for the automobile characterized by concomitant-using polyurethane type resin, acrylic type resin and/or styrene-butadiene type copolymerization resin as a resin component discloses, it was disclosed that said coating composition have excellent chipping-resistant performance namely can be protected from damage of the automobile by stone splatter (chipping) when coating on a tire-house, the underfloor and a front-apron of the automobile, and said coating composition can be formed the coating film having excellent vibration-damping performance for the underfloor etc. of the automobile.

patent documents 1: JP-A1-H06-247344, JP-A1-H06-247353, JP-A1-H06-247355, JP-A1-2004-115565, JP-A1-H11-29737, JP-A1-H08-182961, JP-A1-H07-166093

DESCRIPTION OF THE INVENTION

Problem to be Solved by the Invention

It is therefore an object of the present invention to provide the vibration-damping material in form of sheet having both of vibration-damping performance and chipping-resistant performance, hence, and to provide the vibration-damping material in form of sheet which can be adhered to underfloor or engine room of outdoor of the vehicle interior where vibration-damping performance and chipping-resistant performance are required.

The foregoing and other objects and novel features of the present invention will become clear from the following description and the accompanying drawings.

Means for Solving Problem

The present invention's Claims are as follows.

(Claim 1) A vibration-damping material in form of sheet with chipping-resistant performance having both of vibration-damping performance and chipping-resistant performance comprising:
a non-expanding type thermosetting vibration-damping sheet and an adhesive layer,
the non-expanding type thermosetting vibration-damping sheet including a carbon material in amount from 5 to 15% by weight: a polybutadienic elastomer: a curing agent: a petroleum resin and an inorganic filler.

[claim 2] The vibration-damping material in form of sheet with chipping-resistant performance having both of vibration-damping performance and chipping-resistant performance as claimed in claim 1, wherein the non-expanding type thermosetting vibration-damping sheet including a carbon material in amount from 5 to 15% by weight: a polybutadienic elastomer in amount from 10 to 30% by weight: a curing agent in amount from 1 to 10% by weight: a petroleum resin in amount from 1 to 20% by weight and an inorganic filler in amount from 50 to 70% by weight.

[claim 3] The vibration-damping material in form of sheet with chipping-resistant performance having both of vibration-damping performance and chipping-resistant performance as claims in Claim 1 or 2, wherein the adhesive layer is composed of a tackiness agent or a hotmelt adhesive.

[claim 4] The vibration-damping material in form of sheet with chipping-resistant performance having both of vibration-damping performance and chipping-resistant performance as claimed in Claim 2 or 3, which can adhere to underfloor or engine room of a vehicle where vibration-damping performance and chipping-resistant performance are required.

Effect of the Invention

According to the present invention, the vibration-damping material in form of sheet having both of vibration-damping performance and chipping-resistant performance can be provided, therefore, said vibration-damping material in form of sheet can be adhered to underfloor or engine room of outdoor of the vehicle interior where vibration-damping performance and chipping-resistant performance are required.

According to the present invention, the vibration-damping material in form of sheet with chipping-resistant performance which mainly consists of polybutadienic elastomer differed from asphalt material having chipping-resistant can be provided, and the vibration-damping material in form of sheet with chipping-resistant performance which can be adhered by the intermediary of the adhesive layer composed of the tackiness agent or the hotmelt adhesive to underfloor or engine room of outdoor of the vehicle interior where vibration-damping performance and chipping-resistant performance are required can be provided.

The vibration-damping material of the present invention is the material in form of sheet, said vibration-damping material in form of sheet with chipping-resistant performance can be adhered by means of self-adhesion or thermal fusion via the adhesive layer, because said vibration-damping material in form of sheet with chipping-resistant performance is different from a latex, a plastisol coating and aqueous emulsion type coating composition.

BEST MODE OF CARRYING OUT THE INVENTION

In the present invention, in case of constitution of the thermosetting vibration-damping sheet, we are known that the carbon material does unique act. Namely, when the thermosetting vibration-damping sheet composes, in case of using of one more than synthetic rubber selected from the group consisting of a styrene-butadiene rubber, a butadiene rubber and a high-styrene rubber, the carbon material can be included. However, in that case, it is necessary that the thermosetting vibration-damping sheet contains only a small quantity of said carbon material, for example, the amount thereof preferably is from 1% by weight to 5% by weight.

On the other hand, the amount of said carbon material increase, when the amount of said carbon material was added over 5% by weight of aforementioned blending quantity, even no need of adding of one more than synthetic rubber selected from the group consisting of the styrene-butadiene rubber, the butadiene rubber and the high-styrene rubber, the thermosetting vibration-damping sheet which can be stopped lowering of chipping-resistant performance and can be gave vibration-damping performance can be obtained.

The amount of said carbon material in case of no using one more than the synthetic rubber selected from the group consisting of the styrene-butadiene rubber, the butadiene rubber and the high-styrene rubber is from 5 to 15% by weight.

As said carbon material, in one version of this, a carbon black can be recited for example.

In addition, when explain aforementioned one more than synthetic rubber selected from the group consisting of the styrene-butadiene rubber, the butadiene rubber and the high-styrene rubber, the styrene-butadiene rubber (SBR) is the copolymer made by generally copolymerization of emulsion polymerization of butadiene rubber and styrene.

The styrene-butadiene rubber can be used for example liquid styrene-butadiene rubber.

There is not especially a limit to the weight-average-molecular-weight, for example, the weight-average molecular-weight of from 5000 to 20000 can be applied.

The butadiene rubber (BR) can be obtained by solution polymerization of butadiene in carbon hydride solvent in the presence of a catalyst for example composed of organic metallic compound such as Ziegler catalyst or the like.

The butadiene (BR) can be used a polymer of 1,2-butadiene, but also, generally, it can be indicated butadiene rubber by polymerization of 1,3-butadiene of conjugated diene The term of high-styrene rubber calls about high content of styrene monomer in butadienic rubber (SBR), for example, it can be obtained by copolymerization of butadiene rubber and styrene same as above-mentioned styrene-butadiene rubber, bonding styrene amount (styrene monomer content.) of above-mentioned styrene-butadiene rubber is low generally 23.5 volume percentage, on the other hand, in the high-styrene rubber, it has high bonding styrene amount which is generally more than 50 volume percentage (general-purpose goods is more than 60 volume percentage.), the term of high-styrene rubber calls about such as high bonding styrene amount thereof.

The thermoplastic elastomer in the present invention is an elastomer having the behavior which shows flow property owing to softening by heating and get back to rubber-like elastic body by cooling. It is different from that above-mentioned "rubber" does not get soft by adding heat.

Namely, the thermoplastic elastomer has rubber-like behavior at normal temperature, but, it is polymeric material same as thermoplastic resin which can be melt-molded such as injection molding or the like at high temperature.

The thermoplastic elastomer can be classified olefin type, styrene type, polyvinyl chloride type, urethane type, polyester type, polyamide type, fluorine type, butadiene type or the like, in the present invention, the thermoplastic elastomer can be used polybutadiene type thermoplastic elastomer (the polybutadienic elastomer).

The polybutadienic elastomer can be used for example the copolymer of 1,2-polybutadiene and conjugated diene compound, hydro-copolymer thereof, ionomer and polyolefin carboxy denatured compound or the like.

The 1,2-polybutadiene can be recommended the 1,2-polybutadiene having more than 70% preferably more than 85% of 1,2 bonding content, and more than 5% preferably from 10% to 40% degree of crystallization. Molecular weight thereof is preferably express as $[\eta]$ (at toluene, 30 degrees C.) of more than 0.5 dl/gr in order to obtain miscibility-workability and cross-linking property The conjugated diene compound can be used for example an isoprene.

As the thermoplastic elastomer in the present invention, it can be cited representatively syndiotactic 1,2-polybutadiene, for example, it can be cited the syndiotactic 1,2-polybutadiene which included 1,2-bonding of more than 90% and composed of average molecular weight of from 10 several tens of thousands to 20 several tens of thousands.

The curing agent composed of the thermosetting vibration-damping sheet in the present invention for example can be cited a sulfur or a compound which generates a sulfur by heating.

The sulfur can be used for example general sulfur such as a powder sulfur and a colloid sulfur or the like, also, the compound which generates the sulfur by heating can be used for example tetramethyl thiraum disulfide and tetraethyl thiraum disulfide.

As petroleum resin composed of the thermosetting vibration-damping sheet in the present invention, it can be cited for example aliphatic (C5) type petroleum resin: aromatic (C9) type petroleum resin and aliphatic/aromatic copolymerization (C5/C9) type petroleum resin produced by cationic polymerization of C5 fraction or C9 fraction made from naphtha cracker In the present invention, it can be used terpene type resin or the like too.

As the inorganic filler composed of the thermosetting vibration-damping sheet in the present invention, it can be cited for example a calcium carbonate, a barium sulfate, a magnesium hydroxide, a mica, a talc, a clay, a silicic acid, a zeolite, a diatom earth and a silica.

In the present invention, as the need arises, in case of construction of the thermosetting vibration-damping sheet, a rubber accelerator, a softener and a variety auxiliary agent or the like can be used.

As examples of said rubber accelerator, thiazole type rubber accelerator, sulfenamide type rubber accelerator and guanidine type rubber accelerator can be cited, in particular, for example, the following materials can be cited.

N-Cyclohexyl-2-benzothiazolyl sulfen amide (CBS),
N-tert-butyl-2-benzothiazolyl sulfen amide (BBS),
N,N-dicyclohexyl-2-benzothiazolyl sulfen amide (DCBS),
2-mercaptobenzothiazole (MBT),
Dibenzothiazyl disulfide (MBTS),
diphenyl guanidine (DPG).

And, a morpholine disulfide heretofore known as vulcanized agent can be used.

Also, as the softener, it can be cited a mineral oil group softener for rubber called generally a process oil and an extender oil. The softener can be used preferably naphthenic group and aromatic group from the aspect of compatibility to the other aforementioned components.

The various groups of auxiliary can be cited for example a vulcanized assistant, the vulcanized assistant can be cited for example an inorganic group zinc oxide, a magnesium oxide, an organic group stearic acid and kind of amines.

The amount of said carbon material in case of no using one more than the synthetic rubber selected from the group consisting of the styrene-butadiene rubber, the butadiene rubber and the high-styrene rubber is from 5 to 15% by weight.

If the blending amount of said carbon material is below 5% by weight, lowering of the chipping-resistant performance was caused, on the other hand, if it exceeds 15% by weight, when heating and baking of the vibration-damping material was done, the depressed-volume and the shrinkage-ratio will be give way from necessary physicality, according to this fact, if when the vibration-damping material putted into the necessary parts of the vehicle and carried out heating-fusion, the heating-fusion can not be done gnathonically the shape of the vehicle, the defection that vibration-damping performance can not be obtained easily occurs.

When preferable composition of the present invention show, the non-expanding thermosetting vibration-damping sheet including the carbon material of amount from 5 to 15% by weight: the polybutadienic elastomer of amount from 10 to 30% by weight: the curing agent of amount from 1 to 10% by weight: the petroleum resin of amount from 1 to 20% by weight and the inorganic filler.

The thermosetting vibration-damping have both vibration-damping performance and chipping-resistant performance.

In the present invention, the blending amount of the polybutadienic elastomer is from 10 to 30% by weight.

If the blending amount of the polybutadienic elastomer is below 10% by weight, the debasement of the chipping-resistant performance incurs, the adherence and adulation performance drop.

On the other hand, if the blending amount of the polybutadienic elastomer exceeds 30% by weight, when heating and baking of the vibration-damping material was done, the depressed-volume and the shrinkage-ratio will be give way from necessary physicality, according to this fact, if when the vibration-damping material putted into the necessary parts of the vehicle and carried out heating-fusion, the heating-fusion can not be done gnathonically the shape of the vehicle, the defection that vibration-damping performance can not be obtained easily occurs.

In the present invention, the blending amount of the curing agent is from 1 to 10% by weight.

If the blending amount of the curing agent is below 1% by weight, the debasement of chipping-resistant performance incurs, the adherence performance and flattery performance according to form of steel drops.

On the other hand, if the blending amount of the curing agent exceeds 10% by weight, when heating and baking of the vibration-damping material was done, the depressed-volume and the shrinkage-ratio will be give way from necessary physicality, according to this fact, if when the vibration-damping material putted into the necessary parts of the vehicle and carried out heating-fusion, the heating-fusion can not be done gnathonically the shape of the vehicle, the defection that vibration-damping performance can not be obtained easily occurs.

In the present invention, the blending amount of the petroleum resin is from 1 to 20% by weight.

If the blending amount of the petroleum resin is below 1% by weight, the debasement of the chipping-resistant performance incurs, also, the adherence and adulation performance drop. On the other hand, if the blending amount of the petroleum resin exceeds 20% by weight, when the vibration-damping material heated and baked, the depressed volume and the shrinkage ratio will be give way from necessary physicality, according to this fact, if when the vibration-damping material was putted in the necessary parts and heated fusion, it can not fusion bond gnathonically the shape of the vehicle, the defect that vibration-damping performance can not be obtained easily occurs.

In the present invention, the blending amount of the inorganic filler is from 50 to 70% by weight.

If the blending amount of the inorganic filler is below 50% by weight, the chipping-resistant performance can not be obtained, on the other hand, if it exceeds 70% by weight, the thermosetting vibration-damping sheet became fragile and weak, hence, it lacks in practicality.

The thermosetting vibration-damping sheet can be obtained by dispersing and mixing of each above-mentioned compound used a mulling machine which conventionally publicly known mixture-dispersion-machines such as a dissolver, a banbury-mixer, open-kneader and vacuum-kneader, and then, by forming in form of sheet used the processing-machinery such as a calendering roll and an extruder or the like.

The adhesive layer in the present invention is important, because it is the thermosetting vibration-damping sheet in form of sheet, it can be adhered to the parts of outdoor of the vehicle interior for example the underfloor or engine room, specially, it can be adhered to parts where both of the vibration-damping performance and chipping-resistant performance are required.

The adhesive layer composed of the adhesive or the hot-melt adhesive.

The adhesive layer have object of self-adhesive bonding or heat-melt adhesive bonding.

The adhesives can be composed by mixing base-materials of many kinds of high polymer elastomer with optional materials of a tackifiers, a cross-linking agent, a stabilizer, a plasticizer, and so on.

The adhesives can roughly be classified into a rubber type, an acrylic type and a silicone type by the kinds of using elastomers. As the adhesives, for example, the acrylic type adhesives can be used.

The acrylic series adhesives can be composed of acrylic ester-based copolymer.

As the tackifiers, the terpene-based resin and the petroleum resin used in above thermosetting vibration-damping sheet can be exemplified The cross-linking agent can be used too the sulfur or the like used in above-mentioned thermosetting vibration-damping sheet.

As the stabilizer, a saturated or unsaturated fatty acid metal salt of carbon number 12 to 20 such as hydrotalcite, lauric acid, stearic acid, recinoleic acid and so on can be exemplified.

As the metal salt, zinc salt, calcium salt, barium salt, lead salt and so on can be listed. Specifically, as the metal soap, for example, lauric acid calcium, calcium stearate, recinoleic acid calcium, zinc laurate, zinc ricinoleate, zinc stearate, lauric acid barium, barium stearate, recinoleic acid barium and so on can be listed. Also, as the stabilizer, a phosphite of a phosphorus series and so on can be blended.

As the plasticizer, for example, a polyester type plasticizer can be listed. Said polyester type plasticizer can be recited, for example, a polyester plasticizer made by polycondensation between a glycol having carbon number from 2 to 10 such as an ethylene glycol, a propylene glycol, a butylene glycol, a neo pentyl glycol, a hexane diol, or the like; with a dicarboxylic acid such as aliphatic and/or aromatic type dicarboxylic acid having carbon number from 2 to 10 for example an adipic acid, an azelaic acid, a sebacic acid, a phthalic acid, an isophthalic acid, a terephthalic acid and so on.

As the hotmelt adhesive, for example, it can be listed that the hotmelt adhesive comprised of component of resins such as polyolefinic resin, denaturation polyolefinic resin, polyurethanic resin, ethylene-ethyl acrylate copolymer type resin, ethylene-acrylic acid copolymer type resin, ethylene-vinyl acetate copolymer type resin, polyamide type resin, polyester type resin, thermoplastic elastomer type resin, styrene-butadiene copolymer type resin, styrene-isoprene copolymer type resin, and so on.

The hotmelt adhesive comprising component of polyurethanic resin is moisture curing hot-melt type adhesive, it is the adhesive included urethane prepolymer having isocyanate radical in terminal group, generally, it can be coated on both of a steel substrate and the thermosetting vibration-damping sheet in condition of heating-melting, after beginning-adhesion by cooling-solidification, the isocyanate radical was cross-linked with atmospheric moisture, according to the moisture curing which urethane prepolymer became high-molecular-weight polymer, it became the adhesive which can be stepped up both the adhesive-force property and the heat-resisting property.

The urethane prepolymer can be obtained by heretofore known reaction with between the polyols such as polyoxy tetramethylene glycol (PTMG) or the like and the isocyanate compound equally compound having the partial structure of NCO radical.

The vibration-damping material convert into the vibration-damping material in form of sheet which united the thermosetting vibration-damping sheet and the adhesive layer composed of aforementioned the adhesive or the hotmelt adhesive.

When this vibration-damping material in form of sheet was adhered to underfloor or engine room of the vehicle interior where vibration-damping performance and chipping-resistant performance are required, it can be carried out chipping-resistant performance and vibration-damping performance.

The vibration-damping material can be used certainly in the various area such as the production machinery, transport machinery and industrial machinery, as mentioned above, using in the vehicle area is desirable. When give using example, in the vehicle area, the vibration-damping material unified and pressure-bonded make punching-manufacturing by the conventionally publicly known process machinery such as a pressing machine and the like agree to the construction parts of the vehicle, then make construction by adhesive-work in a post called body shop of the vehicle production factory

EXAMPLES

In order to help an understanding of the present invention below, a specific working example is described. Although it is needless to say, the present invention is not limited to the following working examples.

Reference Example 1

The thermosetting vibration-damping sheet (board thickness 3 mm) was prepared accordance with composition (weight part, the following is the same) of Table 1, and the aqueous type acrylic adhesives of thickness 100 micrometer (DRY) as the adhesion layer was coated on above sheet.

Above obtained sample (size 45×120 mm) was set to the electrode position coating steel plate board of the account size of following, and it was heated for 30 minutes and was cured within 150 degrees C. by a hot wind circle method constant temperature bath.

Above obtained material was used as a specimen.

About said specimen, the following examination was carried out.

Test method;

(A) Chipping-resistant performance (Samples size 45×120 mm, a board size 70×150×0.8 mm)

(1) Nut drop test

Every 3 kg of nuts was dropped on the center of the sample of a specimen, and the total fall weight of the nut was inquired when abnormalities such as a crack and a gap of a substrate was occurred in a sample.

Moreover, a maximum fall weight was 60 kg (3 kg×20 number of times), the wear depth (mm) of the sample was measured, when generating of abnormalities did not looked at the sample.

(II) Stepping stone impact test

Every 500 g of the sample pieces of the specimen was collided on the samples by a stepping stone testing machine, and the total weight was inquired when the stepping stone was collided with the sample and the abnormalities such as a crack and a gap of a substrate, was occurred.

In case of abnormalities was occurred, the then standard of total weight established at 1 kg.

Moreover, the weight of the collision was a maximum of 5 kg (500 g×10 number of times).

(B) Vibration-damping performance (samples size 15×200 mm)

With the resonance method (refer to Acoustical Materials Association of JAPAN publication "Noise Cure Handbook" 438 page, the method which the vibration added in middle point, board size; 300×30×0.8 mm, made by steel plate), the loss-factor η (200 Hz conversion) in each temperature of 20 degrees C., 40 degrees C. and 60 degrees C. was measured. In addition, it is judged that the more the value of the loss-factor η was large, the more the performance of vibration-damping was high, and it make judgments that the performance of vibration-damping is adequate when if said value is 0.05 or more values.

The results obtained are shown in Table 2.

Reference Example 2

The thermosetting vibration-damping sheet (board thickness 3 mm) was prepared accordance with composition (weight part, the following is the same) of Table 1, and the aqueous type acrylic adhesives of thickness 100 micrometer (DRY) as the adhesion layer was coated on above sheet.

Above obtained sample (size 45×120 mm) was set to the electrode position coating steel plate board of the account size of following, and it was heated for 30 minutes and was cured within 150 degrees C. by a hot wind circle method constant temperature bath.

Above obtained material was used as a specimen.

About said specimen, the same examination as the case of Reference Example 1 was carried out.

The results obtained are shown in Table 2.

Reference Example 3

The thermosetting vibration-damping sheet (board thickness 3 mm) was prepared accordance with composition (weight part, the following is the same) of Table 1, and the aqueous type acrylic adhesives of thickness 100-micrometer (DRY) as the adhesion layer was coated on above sheet.

Above obtained sample (size 45×120 mm) was set to the electrode position coating steel plate board of the account size of following, and it was heated for 30 minutes and was cured within 150 degrees C. by a hot wind circle method constant temperature bath.

Above obtained material was used as a specimen.

About said specimen, the same examination as the case of Reference Example 1 was carried out.

The results obtained are shown in Table 2.

Example 1

The thermosetting vibration-damping sheet (board thickness 3 mm) was prepared accordance with composition (weight part, the following is the same) of Table 1 and the aqueous type acrylic adhesives of thickness 100 micrometer (DRY) as the adhesion layer was coated on above sheet. Above obtained sample (size 45×120 mm) was set to the electrode position coating steel plate board of the account size of following, and it was heated for 30 minutes and was cured within 150 degrees C. by a hot wind circle method constant temperature bath. Above obtained material was used as a specimen. About said specimen, the same examination as the case of Reference Example 1 was carried out. The results obtained are shown in Table 2.

COMPARATIVE EXAMPLE

Comparative Example 1

The thermosetting vibration-damping sheet (board thickness 3 mm) was prepared accordance with composition (weight part, the following is the same) of Table 1, and the aqueous type acrylic adhesives of thickness 100 micrometer (DRY) as the adhesion layer was coated on above sheet.

Above obtained sample (size 45×120 mm) was set to the electrode position coating steel plate board of the account size of following, and it was heated for 30 minutes and was cured within 150 degrees C. by a hot wind circle method constant temperature bath.

Above obtained material was used as a specimen.

About said specimen, the same examination as the case of Reference Example 1 was carried out.

A test results are shown in Table 2.

Table I

| | | No. | | | | |
|---|---|---|---|---|---|---|
| Component | | Reference example 1 | Reference example 2 | Reference example 3 | Example 1 | Comparative example 1 |
| Synthetic-rubber 1 | Styrene-butadiene-rubber | 3.0 | | | | |
| Synthetic-rubber 2 | Butadiene rubber | | 3.0 | | | |
| Synthetic-rubber 3 | High-styrene rubber | | | 3.0 | | |
| Thermoplastic-elastomer | Polybutadienic-elastomer | 14.0 | 14.0 | 14.0 | 17.0 | 17.0 |
| Curing agent | Sulfur | 5.0 | 5.0 | 5.0 | 5.0 | 5.0 |
| Petroleum-resin | Aromatic type-petroleum-resin | 3.0 | 3.0 | 3.0 | 3.0 | 3.0 |
| Inorganic filler | $CaCO_3$ | 63.0 | 63.0 | 63.0 | 54.0 | 63.0 |
| Carbon material | Carbon black | 1.0 | 1.0 | 1.0 | 10.0 | 1.0 |
| Rubber-accelerator | Thiazole type | 5.0 | 5.0 | 5.0 | 5.0 | 5.0 |
| Softener | Oil | 2.0 | 2.0 | 2.0 | 2.0 | 2.0 |
| Auxiliary | Vulcanized assistant | 4.0 | 4.0 | 4.0 | 4.0 | 4.0 |
| | | 100 | 100 | 100 | 100 | 100 |

Table II

| | | No. | | | | |
|---|---|---|---|---|---|---|
| Test item | | Reference example 1 | Reference example 2 | Reference example 3 | Example 1 | Comparative example 1 |
| Nut drop test | | Nomal (Wear 1.0 mm) | Nomal (Wear 1.3 mm) | Nomal (Wear 1.2 mm) | Nomal (Wear 1.9 mm) | Abnormal Gap at 33 kg |
| Stepping stone-impact test | | Nomal Until maximum 5 kg | Nocrack Until 3.5 kg | Nomal Until maximum 5 kg | Nocrack Until 2.5 kg | Abnormal Cracked at 1.0 kg |
| Vibration-damping-performance | 20° C. | 0.029 | 0.033 | 0.025 | 0.025 | 0.026 |
| | 40° C. | 0.25 | 0.23 | 0.30 | 0.27 | 0.28 |
| | 60° C. | 0.27 | 0.22 | 0.33 | 0.31 | 0.3 |

[Results];

Such as shown in aforementioned result of Table 2, the goods of the present invention and reference could not observed the occurrence of abnormalities such as the crack and the gap of the substrate at the nut drop test. Also, the result of the stepping stone impact test was good too, it can be understand that the chipping-resistant performance and the vibration-damping performance can be provided.

On the other hand, in Comparative good, at the nut drop test, the occurrence of abnormalities such as the crack and the gap of the substrate was observed, also, at the stepping stone impact test, the shallow wear depth was shown, and the result of the stepping stone impact test was not good.

Industrial Applicability

The present invention can be applied not only the automobile but also almost all the vehicle.

The invention claimed is:

1. A vibration-damping material in form of sheet with chipping-resistant performance having both of vibration-damping performance and chipping-resistant performance comprising:
   a non-expanding type thermosetting vibration-damping sheet and an adhesive layer,
   the non-expanding type thermosetting vibration-damping sheet including a carbon material in amount from 5 to 15% by weight; a polybutadienic elastomer; a curing agent; a petroleum resin and an inorganic filler.

2. The vibration-damping material in form of sheet with chipping-resistant performance having both of vibration-damping performance and chipping-resistant performance as claimed in claim 1, wherein the non-expanding type thermosetting vibration-damping sheet including a carbon material in amount from 5 to 15% by weight; a polybutadienic elastomer in amount from 10 to 30% by weight; a curing agent in amount from 1 to 10% by weight; a petroleum resin in amount from 1 to 20% by weight and an inorganic filler in amount from 50 to 70% by weight.

3. The vibration-damping material in form of sheet with chipping-resistant performance having both of vibration-damping performance and chipping-resistant performance as claimed in claim 1, wherein the adhesive layer is composed of a tackiness agent or a hotmelt adhesive.

4. The vibration-damping material in form of sheet with chipping-resistant performance having both of vibration-damping performance and chipping-resistant performance as claimed in claim 1, which can adhere to underfloor or engine room of a vehicle where vibration-damping performance and chipping-resistant performance are required.

* * * * *